Patented June 29, 1937

2,085,535

UNITED STATES PATENT OFFICE 2,085,535

PROCESS FOR THE POLYMERIZATION OF UNSATURATED HYDROCARBONS

Siegfried Leonard Langedijk and Adrianus Johannes van Peski, Amsterdam, Netherlands, assignors to Shell Development Company, San Francisco, Calif., a corporation of Delaware No Drawing. Application January 4, 1936, Serial No. 57,510. In Great Britain April 29, 1930

11 Claims. (Cl. 196—10)

This application is a continuation-in-part of our application Serial No. 528,454, filed April 7, 1931, and relates to the manufacture of higher molecular weight hydrocarbons from normally gaseous low molecular weight unsaturated hydrocarbons of the olefine series of not more than 5 carbon atoms per molecule.

It is well known that unsaturated hydrocarbons such as olefines may be polymerized by a heat treatment whether or not under pressure and, if desired, in the presence of suitable catalysts.

As catalysts various inorganic halides have already been proposed and different halides are known to be capable of promoting the polymerization. Thus it is known, for instance, to polymerize olefines in the presence of aluminum chloride which is dispersed in gasoline.

A drawback of these known processes is, in general, that the nature of the polymerization products cannot be sufficiently controlled. The substances obtained after the treatment constitute a mixture of higher and lower polymerization products, the nature of which differs considerably.

It has now been ascertained that the polymerization can be controlled at will with the result that either the nature of the polymerization products can be determined beforehand or the yield can be favorably influenced, or both of said beneficial effects can be obtained, particularly if normally gaseous olefines are subjected to said polymerization.

Our invention consists in a process for the polymerization of normally gaseous unsaturated hydrocarbons, in particular of the olefine series, by treating the said hydrocarbons in the presence of catalysts, under normal or increased pressure, characterized in that the polymerization is effected in the presence of catalysts obtained by treating inorganic halides, especially those of the elements with a valency of three or more, with organic substances which influence the polymerization action of the said halides and which under the conditions of the reaction do not combine, or only combine to a negligible extent with the unsaturated hydrocarbons according to the Friedel and Crafts reaction.

According to our invention the inorganic halides are treated with suitable organic or inorganic compounds or organic solvents for said inorganic halides. By combining an inorganic halide with suitable organic and/or inorganic compounds or by dissolving it in a suitable organic liquid, complex compounds are formed, the polymerization power of which is consistently smaller than that of the inorganic halide itself. This tempering of the polymerization power causes the polymerization to proceed less violently and up to a well defined controllable stage, control being usually difficult to achieve, if at all, in the case when the halide is applied as such or is distributed on inert supports or suspended in inert liquids of the type of naphtha, chlorinated aliphatic hydrocarbons, etc., which are incapable of forming complexes with the active polymerization catalysts.

While it is known that different inorganic halides have different effects on the polymerization of unsaturated hydrocarbons, it shall be understood that according to the invention it is possible to modify the polymerization power of one and the same halide by combining it with a variety of polar organic or inorganic compounds or by dissolving it in different organic polar liquids, so as to obtain control of the progress of polymerization and in consequence thereof polymerization products of the desired nature.

It is known that various aromatic hydrocarbons such as benzene may combine with olefines under the influence of aluminum chloride, which reaction is known as that of Friedel and Crafts. No claim is made herein to such reactions, but only those organic compounds or liquids which under the circumstances of the reaction do not combine or only to a negligible extent, with the unsaturated hydrocarbons according to the reaction of Friedel and Crafts are employed. The complex compounds of the inorganic halides and organic compounds may be employed as such, i. e., in the liquid or solid state, or they may be used dissolved or dispersed in suitable liquids.

Suitable active halides are those of the type of aluminum chloride such as halides of aluminum, boron, iron, tin, antimony, bismuth, arsenic, molybdenum, tungsten, vanadium, titanium, thorium and zirconium or mixtures thereof.

Among the organic non-hydrocarbon compounds capable of forming complex compounds with the active metal halides are those of not more than 15 carbon atoms belonging to the group of nitro hydrocarbons, ketones, mono carboxy chlorides, sulfones and sulfates. These compounds are strongly polar, are substantially stable in the presence of the active halides forming complexes therewith and do not react with the olefines according to Friedel and Crafts reaction.

The term "polar substance" refers to compounds in which the center of gravity of the positive electric charge does not coincide with the center of gravity of the negative electric charge, thus giving rise to a dipole moment.

Examples of the above classes of polar organic compounds which are particularly useful for our purpose are:

Nitro hydrocarbons, such as nitro alkanes of not more than 15 carbon atoms, of which nitro methane, nitro ethane, nitro pentanes and nitro heptanes, are specific examples; or nitro compounds of benzene or its homologues and analogues, for instance nitro benzene, di-nitro benzene, nitro toluene, nitro xylenes, nitro naphthalenes, and nitro anthracenes.

Ketones, such as aliphatic ketones of 15 and less carbon atoms, for example acetone, methyl ethyl ketone, di-amyl ketone; or aryl ketones, for instance acetophenone and benzophenone.

Acid chlorides of mono-carboxylic acids of 15 and less carbon atoms, such as acetyl chloride, propyl carboxyl chloride and benzoyl chloride.

Alkyl and aryl sulfones of 15 and less carbon atoms, for instance, di-ethyl sulfone, ethyl phenyl sulfone and di-phenyl sulfone.

Alkyl and/or aryl sulfates or sulfonates of not more than 15 carbon atoms, such as di-ethyl sulfate, di-isopropyl sulfate, methyl-benzyl sulfate, and ethyl benzol sulfonic acid ester.

If the organic compound used to form complexes is a liquid and the complex formed is soluble therein, the solution so formed may be used as catalyst; or the complex may be isolated, for instance by extraction, and be used by itself. Complexes which are insoluble in the organic liquid, may be separated if desired and be dissolved in suitable solvents before use. Thus the solution of the compound of aluminum chloride and nitrobenzene in nitrobenzene may be extracted with gasoline to remove at least part of the excess of nitrobenzene, whereby a liquid is obtained which is very suitable for effecting polymerization; or the solid complex compound of aluminum chloride and di-phenyl sulfone may be used per se or in solution of a suitable solvent.

The polymerization may be effected at room temperature or at a higher or lower temperature and it may be advantageous to carry out the reaction under pressure. As the polymerization reaction is exothermic, it is sometimes advantageous to control the reaction temperature by applying external cooling.

It was found that the precise conditions for a smooth polymerization treatment, depending on the product desired to be obtained and the olefine or mixture of olefines started from, always have to be predetermined. Thus, for instance, if a polymerization product with very good lubricating properties is required, very good results are obtained with isobutylene when working at a temperature ranging between about −10° and about +10° C. With propylene the range of temperature is higher, if the same final product is required.

Generally speaking, care should be taken that an intimate contact is effected between the olefines and the catalytic mass. In many cases the polymerization products form a separate liquid layer in the reaction medium, and may be recovered by decantation or in any other suitable way. Occasionally the polymerization products are wholly or partly soluble in the organic liquid, so that said products may be obtained in some other way, e. g., by distillation of the reaction mass.

Nitromethane, inter alia, has the advantage that it does not dissolve the polymerization products. Neither does the liquid, consisting of the compound of aluminum chloride and nitrobenzene and from which free nitrobenzene has been removed. In addition to its catalytic action, aluminum chloride has the advantage that it decreases the miscibility of the polymerization products in the organic liquids.

As mentioned above, the nature of the inorganic halide and in addition the nature of the organic compound have an important influence on the nature of the polymerization products. Thus, for instance, when treating isobutylene with aluminum chloride and nitromethane, a higher and more viscous polymerization product is obtained than when the treatment is carried out with the aid of aluminum chloride and nitrobenzene.

In the foregoing we have described complex catalysts composed of active metal halides and certain organic compounds. Our invention, however, is not limited to the above type of complex catalysts. We have found that equally good results can be obtained by polymerizing normally gaseous olefines with inorganic double salts of the active metal halide and a substantially inactive metal halide. Useful inactive halides are those of the elements of the 1st group of the periodic system, ammonia, the alkali earth metals and the true metals which have atomic weights above 100. Typical examples of inorganic double salts which have a tempered polymerizing action, i. e., a polymerizing action which is less violent than that of the active ingredient, are as follows: Boron fluoride with sodium fluoride, cadmium fluoride, silver fluoride, tin fluoride, etc.; aluminum chloride, zinc chloride, iron chloride, phosphorus trichloride, phosphorus oxychloride, arsenic trichloride, antimony trichloride, selenium chloride, etc., with the chlorides of lithium, potassium, copper, magnesium and barium, cadmium, mercury, thallium, lead, tin, etc.; aluminum bromide with bromides of ammonia, sodium, silver, strontium, etc.

The inorganic double salt catalysts can be further modified and tempered if desired by combining them with the organic compounds capable of forming complex compounds with the active catalyst. Three component complexes such as $BF_3KF$ - nitromethane, $AlCl_3AgCl$ - nitrobenzene, $AlCl_3TlCl$-methyl-ethyl ketone, etc., frequently are useful when it is desired to exert over the polymerization reaction a certain control which otherwise is difficult to achieve.

While the complex catalysts described above may be used in treating any olefines or mixtures of two or more olefines, or gases, vapors or liquids containing unsaturated hydrocarbons which are capable of being polymerized, we have found that particularly good results are obtained by restricting the treatment to normally gaseous olefines. Thus when for instance treating a cracked gasoline which may contain olefines in concentrations of 20%, 50% or even higher, in accordance with our invention low yields of polymers of inferior quality are obtained, lubricating oils produced in the reaction being of a sludging nature, and resins being subject to oxidation embrittlement. If, in contrast to the above, normally gaseous olefines are polymerized, oils and resins are produced in greater yields on the basis of olefine content of the treating material, and also these polymers are of much greater resistance to oxidation.

A secondary application of our complex catalyst rests in the separation of mixtures of various olefines. The polymerizing power of the complex catalyst can be so modified that substantially only the most reactive olefines are polymerized, while those of lower reactivity remain unconverted. For instance, ethylene at room temperature is not polymerized by a solution of aluminum chloride in nitrobenzene, whereas propylene is polymerized energetically. Thus by passing a mixture of ethylene and propylene through such a solution the ethylene passes unchanged and may be isolated separately.

The following examples serve to illustrate the invention:

Example 1 demonstrates the value of our complex catalyst as applied to normally gaseous olefines in comparison with their value when applied to heavier olefines contained in a vapor phase cracked gasoline. Examples 2–11 serve to indicate the results that can be obtained by our invention.

1. Isobutylene on the one hand and a liquid phase cracked gasoline on the other hand were polymerized under comparable conditions by means of a solution of 17% of aluminum chloride in nitrobenzene. The cracked gasoline boiled between 40° and 195° C., had a specific gravity of .751, a bromine number of 50 and an olefine content of about 35%.

1000 grams of each of the treating materials were treated for 18 hours at a temperature ranging from 15 to 20° C. The products of the reaction were decomposed with water and distilled with superheated steam under identical conditions.

The isobutylene yielded 73% by weight of an oil having a viscosity at 50° C. of 249° Engler, a Conradson carbon test of .03 and a Dean & Davis viscosity index of +76. The cracked gasoline in contrast to this yielded only 5% by weight of the olefines contained in the gasoline, of an oil having a viscosity at 50° C. of 47.6° Engler, a Conradson carbon test of 2.49 and a viscosity index of −48.

2. 25 grams of sublimed aluminum chloride are dissolved in 100 cc. of nitrobenzene and 14.6 litres of propylene at room temperature are passed through said solution at a velocity of 4 litres per hour. During the reaction a considerable amount of heat is developed. 11.1 litres of the propylene are fixed in the solution while an upper layer of polymerization products, substantially containing no aluminum chloride, separates out. The polymerizate has an initial boiling point of 80° C.; 90% of it distils between 80° and 200° C.

3. Isobutylene at room temperature is passed through a solution prepared as described in the preceding example. Under heat-development the butylene is polymerized. From 50 litres of isobutylene, which are passed through the solution at an initial velocity of 4 litres per hour, which is increased during the treatment, 43.5 litres are fixed. The polymerization products, which form an upper layer on the reaction liquid, are subjected to fractional distillation.

The low boiling fractions obtained are:

| From | Cc. |
|---|---|
| 60–120° C | 4 |
| 120–150° C | 3 |
| 150–170° C | 3 |
| 170–190° C | 6 |

They may be used as gasoline fractions with good antiknock properties.

4. 10 grams of aluminum chloride, 10 grams of diphenyl-sulphone and 100 grams of benzene are mixed together. The mixture constitutes a solution, through which at room temperature 16.5 litres of isobutylene are passed at a velocity of 4 litres per hour. 13.5 litres of isobutylene are fixed and two layers are formed, the upper layer of which consists of polymerization products. On distillation of the upper layer three fractions are obtained, viz.:

| | Percent |
|---|---|
| Boiling between 100° and 160° C., consisting for the greatest part of di-isobutylene | 10 |
| Boiling between 160° and 200° C., mainly consisting of tri-isobutylene | 15 |
| Boiling above 200° C. (higher polymerization products) | 65 |

5. A solution of 20 grams of anhydrous aluminum chloride is brought in a flask on to 50 cc. of nitromethane. While, by cooling with ice, the temperature is kept closely above 0° C., 108 litres of isobutylene gas obtained by slowly vaporizing 450 cc. of liquid isobutylene are introduced into the flask, where it polymerizes to a very viscous oil. This oil is isolated and treated with steam at 200° C., about 30 grams of lower polymerized product being thus removed. The residue from the steam distillation weighs 235 grams and consists of a light yellow, very viscous oil, which at 15° C. had a specific gravity of 0.88 and on being distilled in vacuo under a pressure of 0.5 mm. at 280° C. yielded 62% of residue.

6. A solution of 250 grams of anhydrous aluminum chloride in 720 grams of nitrobenzol is placed in a metal tube filled to the top with Raschig rings. Subsequently propylene is forced under pressure into the tube and while the temperature in the reaction tube rises to about 50° C., the pressure is maintained during 15 hours at 10 to 12 atm. by continuously forcing in propylene under pressure. The gas supply is then stopped and the non-polymerized gas released. The liquid polymerization product and catalyst are subsequently removed from the reaction tube and separated from each other in a separating funnel. The layer of $AlCl_3$ + nitrobenzol may then again be utilized for the next polymerization; the layer of polymerization product, after being shaken with dilute lye, dilute sulfuric acid and water, weighs 300 g. By means of steam at 100° C. 99 grams, consisting substantially of low polymerization product and nitrobenzol, are distilled over; then 81 grams of polymerization product are distilled off with superheated steam at 200° C. The residue (about 120 grams) is a light brown, very viscous oil with very favorable properties as a cylinder oil.

7. Isobutylene was passed at 15° C. into a solution of 10 grams stannic bromide in 90 grams of nitrobenzol, at a velocity of 5 litres per hour. Of the 46.5 litres of gas introduced, 41 litres are polymerized to a little more than 90 grams of liquid hydrocarbons. Treatment with steam of 100° C. followed by a steam distillation at 200° C., yields 3 fractions, the first of which could be split up, by fractionating, into a gasoline and nitrobenzol, whilst the residue which did not volatilize with steam formed a yellowish brown, viscous oil with good properties as a lubricating oil.

8. 20 grams of $AlCl_3$ are dissolved in 50 cc. of nitrobenzol; 8 grams of NaCl are then added.

which dissolves with the evolution of heat (NaCl is insoluble in nitrobenzol alone). In 10 hours 70 litres of gaseous isobutylene—of which 60 litres (about 135 grams) are polymerized—are passed into the liquid which by external cooling is kept at a temperature of 0° C. The reaction mass is then poured on to ice, washed free of acid and treated with steam at 100° C. 50 cc. of steam distillate are thus obtained, which consists substantially of nitrobenzol. By subsequent treatment with superheated steam of 200° C. 20 cc. of polymerization product is distilled over. The residue (a little more than 70 cc.) is a light-yellow, very viscous oil, having the properties of a very good commercial cylinder oil.

9. Isobutylene is passed over the compound AgCl, $AlCl_3$ contained in a tube heated at 120° C. at a velocity of 40 litres per hour. An efficient condenser in which the liquid products formed are condensed, is connected to the tube. When 76 litres of gas have been passed through the tube the temperature having meanwhile risen to 150° C., the passage of the gas is discontinued and the liquid polymerization product is neutralized and fractionated.

After the expulsion of a small quantity of isobutylene from the liquid the following fractions are obtained:

| °C. | Cc. |
|---|---|
| 25– 95 | 10.3 |
| 95–110 | 3.0 |
| 110–170 | 21.0 |
| 170–200 | 9.2 |
| 200–270 | 23.0 |
| (Yellow oil with blue fluorescence) | |
| Above 270° C. | 32.0 |

10. A tube is filled with pumice stone upon which is brought 20% of the compound $$CuCl.AlCl_3.$$

At a temperature of 120° C. 14.8 litres of isobutylene is passed over the catalyst with a velocity of 10 litres per hour, the reaction products being condensed in a condenser through which ice-water is passing. 17 cc. of a liquid condensate are obtained which on being fractionated yields:

| | Cc. |
|---|---|
| Isobutylene (to 40° C.) | 4 |
| From 40–100° C. } gasoline fractions | 4 |
| From 100–170° C. | |
| Hydrocarbons boiling above 170° C. | 5 |

11. A tube is filled with pumice stone, upon which 30% of the compound $NaAlCl_4$ (melting point 148° C.) is distributed. After heating up to 150° C. the mass is cooled to 120° C., whereby the compound remains as a supercooled liquid; isobutylene is then passed over it at a velocity of 4 litres per hour. From 55.5 litres of isobutylene 67 cc. of liquid products condensable in a cooler are obtained. Upon being distilled these yield the following results:

| | °C. |
|---|---|
| Initial boiling point | 25 |
| 10 cc. up to | 77 |
| 20 cc. up to | 106 |
| 30 cc. up to | 137 |
| 40 cc. up to | 169 |
| 50 cc. up to | 226 |
| 54 cc. up to | 255 |
| 10 cc. residue boiling above | 255 |

Loss 2 cc. (partly dissolved isobutylene).

By normally gaseous olefines, as hereinbefore disclosed, are meant mono- and di-olefines of 5 and less carbon atoms per molecule. Examples are ethylene, propylene, butylene, iso-butylene, butadiene, the amylenes, isoprene, etc.

Whereas the presence of diolefines has always been considered to be detrimental to the quality of polymerization products because of the formation of gums and unstable compounds which are subject to oxidation, we have found that the di-olefines can be converted into useful products by means of our modified catalysts. The di-olefines may be polymerized, if desired, jointly with the mono-olefines in the presence of rather weak complex catalyst; or better, the di-olefines are first polymerized with a complex having a very small polymerizing power, which affects the mono-olefines but little. The product of this first polymerization may then be separated and the unpolymerized portion is treated with a more powerful complex catalyst to form a polymerization product of properties similar to those of the first product, whereupon both products may be recombined.

An example of the polymerization of a diolefine follows:

12. 30 cc. of isoprene are added drop by drop in about 1 hour, while constantly shaking, at 0° C. to a mixture of 20 grams of aluminum chloride, 50 cc. of nitrobenzene and 8 grams of ammonium chloride. The isoprene is converted into a solid substance. After the reaction ice water is added, while cooling and shaking, and the mixture acidified with hydrochloric acid, the aluminum chloride being thereby completely dissolved. The nitrobenzene is then distilled over and a solid, ash-free polymerization product having the properties of synthetic rubber is obtained by filtration.

We claim as our invention:

1. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with a non-hydrocarbon polar organic compound which, under the conditions of the polymerization reaction, is incapable of reacting to any substantial extent with olefinic hydrocarbons according to the Friedel and Craft's reaction, said complex catalyst having a smaller polymerization action than the active halide itself.

2. A process for the polymerization of normally gaseous olefinic hydrocarbons which comprises subjecting said hydrocarbons to polymerization in the presence of a complex catalyst resulting from combining aluminum chloride with a non-hydrocarbon polar organic compound which, under the conditions of the polymerization reaction, is incapable of reacting to any substantial extent with olefinic hydrocarbons according to the Friedel and Craft's reaction, said complex catalyst having a smaller polymerization action than the aluminum chloride itself.

3. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with a nitro hydrocarbon of not more than 15 carbon atoms.

4. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with a ketone of not more than 15 carbon atoms.

5. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with a non-hydrocarbon polar organic compound which under the conditions of the polymerization reaction is incapable of combining to any substantial extent with olefinic hydrocarbons according to the Friedel and Craft's reaction, and with a metal halide of lesser activity than the active halide and being capable of chemically combining therewith, said complex catalyst having a smaller polymerization action than the active halide itself.

6. The process of claim 5 in which the olefinic hydrocarbons comprise diolefines.

7. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with an aliphatic nitro hydrocarbon of not more than 15 carbon atoms.

8. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with nitro methane.

9. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with a dialkyl ketone.

10. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with methyl ethyl ketone.

11. A process for the polymerization of normally gaseous olefinic hydrocarbons which comprises subjecting said hydrocarbons to polymerization in the presence of a complex catalyst resulting from combining an active inorganic halide of the type of Friedel and Craft catalysts with an organic sulfone of not more than 15 carbon atoms.

SIEGFRIED LEONARD LANGEDIJK.
ADRIANUS JOHANNES van PESKI.